April 10, 1956  R. BREUER  2,741,024

METHOD OF JOINING ALL-METAL HOSE BY RESISTANCE WELDING

Filed June 20, 1951

INVENTOR:
Robert Breuer
By:

United States Patent Office 2,741,024
Patented Apr. 10, 1956

2,741,024
METHOD OF JOINING ALL-METAL HOSE BY RESISTANCE WELDING

Robert Breuer, Lucerne, Switzerland, assignor to Metallschlauchfabrik A. G., Lucerne, Switzerland Application June 20, 1951, Serial No. 232,550

Claims priority, application Switzerland June 30, 1950

1 Claim. (Cl. 29—454)

It is known to join corrugated metal tubes to diverse types of connecting-members by soldering or brazing. In many cases, direct welding may be applied. Stuffing-box connections also have been known for a long time. Whilst stuffing-boxes do not ensure a heatproof connection, since the yielding material required for the stuffing-box is not heatproof, the operation of soldering the connecting-piece to the corrugated metal tube also does not afford a heat-proof connection. All the autogenous welding or brazing operations cause an annealing of the tube end-portion, the strength and crystalline texture of the thin wall material thus being altered at the very point where the tube movement originates. The tube thereby is very substantially weakened, which fact constitutes a very substantial disadvantage for the movability of the tube.

The method disclosed herein differs from these known methods in that the metal-tube end-portion is deformed to a smooth-wall piece of tubing, whereupon the connecting-piece to be welded thereto is introduced into the said piece of tubing and forced tightly against the inside wall thereof, and the connecting-piece is secured to said piece of tubing through electrical resistance welding. Thanks to the latter, the material is heated at a very limited area and at a point where no movement of the tube occurs.

The method according to the present invention will be explained, by way of example, with the aid of the accompanying drawing.

Figure 1:
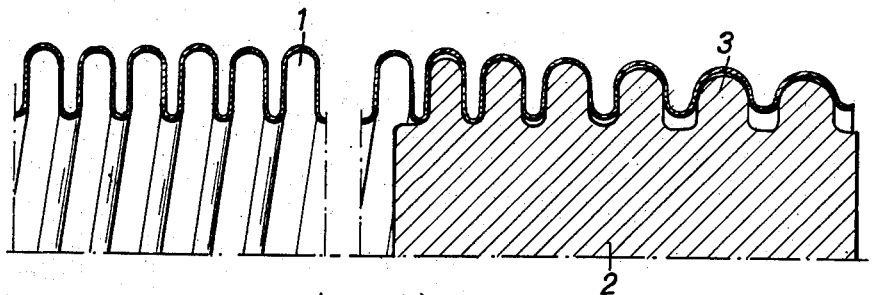
Figure 2:
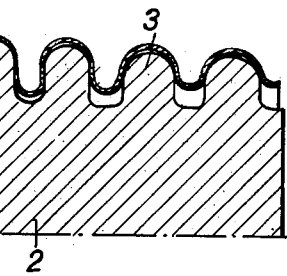

In Fig. 1 is shown an all-metal tube 1 having helical corrugations. In Fig. 2 is shown a mandrel 2 having helical ribs 3 of which the width is gradually increased from one end to the other. By means of the mandrel 2, the corrugations of the tube 1 are very substantially expanded at the end which is to be connected, in a manner known per se and as shown in Fig. 2.

Figure 3:
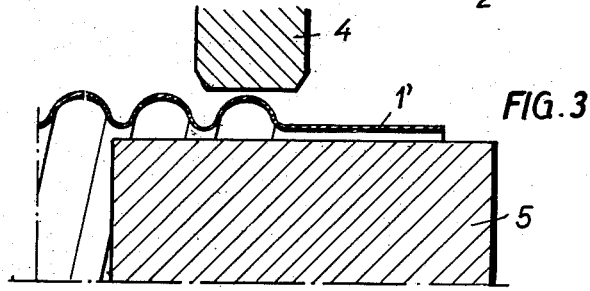

In Fig. 3 are shown two rotary rollers 4, 5 by means of which the widened tube corrugations are completely flattened so as to produce a smooth cylindrical portion 1' at the end of the tube 1.

Figure 4:
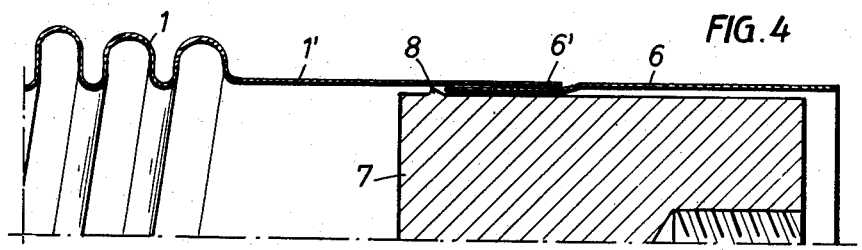

In Fig. 4 is shown a connecting-piece 6 (adapter or union) which is to be secured to the tube portion 1', and which, by a method known per se, has been reduced in diameter at the respective end 6' by an amount substantially equal to twice the wall thickness of the tube end-portion 1'. In Fig. 4, an expanding-tool in form of a mandrel 7 is shown, which has a small collar 8 at the end. When the mandrel 7 is drawn through the portions 6' and 1; the latter are expanded, whereby the portion 6' is forced tightly against the inside wall of the smooth cylindrical portion 1' so that the surfaces which have to be welded lie closely one upon the other and permit a good and tight electric resistance welding.

Figure 5:
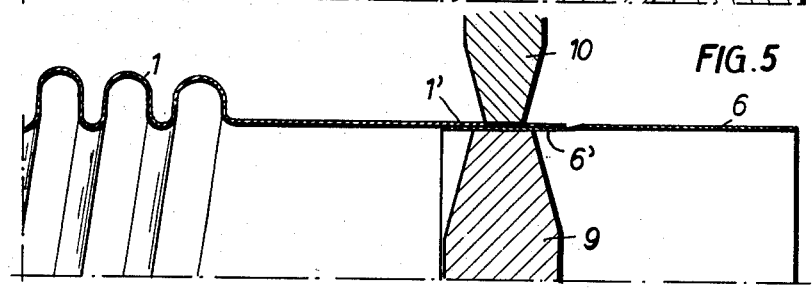

In Fig. 5 is shown an interior electrode 9 and an exterior electrode 10, by means of which the two portions are interconnected through resistance welding. During the welding operation, the material is heated solely at the point of weld, i. e. only at the smooth tube end-portion 1' and the portion 6' of the connecting-piece 6, whilst the corrugated metal tube proper is not heated and its metallurgical texture is preserved.

What I claim as new is:

A method for securing a metal hose having a corrugation to a tubular member, comprising the steps of removing the corrugations of a hose end portion by subsequently forcing into the corrugations of said hose end portion corrugation engaging means of increasing width and thereby widening and thus flattening said corrugations of said hose end portion so as to form a smooth cylindrical hose end portion coaxial with said corrugated metal hose; inserting an end portion of said tubular member into said thus formed smooth cylindrical hose end portion; pressing the outer sufrace of said end portion of said tubular end member, and the inner surface of said cylindrical hose end portion into full and tight engagement; and forming an annular seam between said cylindrical smooth hose end portion and said end portion of said tubular member by electric resistance welding.

References Cited in the file of this patent

UNITED STATES PATENTS

| 1,285,987 | Grunhow | Nov. 26, 1918 |
| 1,462,474 | Atkinson | July 24, 1923 |
| 1,658,603 | Kowal | Feb. 7, 1928 |
| 1,704,326 | Junkers | Mar. 5, 1929 |
| 1,705,622 | Mallory | Mar. 19, 1929 |
| 1,727,281 | Fulton | Sept. 3, 1929 |
| 2,023,417 | Guarnaschelli | Dec. 10, 1935 |
| 2,089,242 | Whitesell, Jr. | Aug. 10, 1937 |
| 2,268,088 | Scholtes | Dec. 30, 1941 |
| 2,358,291 | Fentress | Sept. 12, 1944 |
| 2,485,969 | Johnson | Oct. 25, 1949 |

FOREIGN PATENTS

| 1,913 | Austria | Aug. 10, 1900 |